United States Patent
Cook et al.

(10) Patent No.: US 7,185,215 B2
(45) Date of Patent: Feb. 27, 2007

(54) MACHINE CODE BUILDER DERIVED POWER CONSUMPTION REDUCTION

(75) Inventors: Thomas E Cook, Essex Junction, VT (US); Ian R Govett, Richmond, VT (US); Suhwan Kim, Nanuet, NY (US); Stephen V. Kosonocky, Wilton, CT (US); Peter A. Sandon, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 10/248,838

(22) Filed: Feb. 24, 2003

(65) Prior Publication Data

US 2004/0168097 A1    Aug. 26, 2004

(51) Int. Cl.
    *G06F 1/32* (2006.01)
(52) U.S. Cl. .................. 713/320; 713/300; 713/322; 713/323; 713/324
(58) Field of Classification Search ................ 713/300, 713/320, 322, 323, 324
    See application file for complete search history.

(56) References Cited

U.S. PATENT DOCUMENTS

| | | | |
|---|---|---|---|
| 5,430,850 A | 7/1995 | Papadopoulos et al. | |
| 5,530,964 A | 6/1996 | Alpert et al. | |
| 5,790,877 A * | 8/1998 | Nishiyama et al. | 713/323 |
| 5,996,083 A * | 11/1999 | Gupta et al. | 713/322 |
| 6,064,818 A | 5/2000 | Brown et al. | |
| 6,077,315 A | 6/2000 | Greenbaum et al. | |
| 6,134,708 A | 10/2000 | Yui | |
| 6,161,219 A | 12/2000 | Ramkumar et al. | |
| 6,292,883 B1 * | 9/2001 | Augusteijn et al. | 712/209 |
| 6,308,320 B1 | 10/2001 | Burch | |
| 6,332,216 B1 | 12/2001 | Manjunath | |
| 6,343,374 B1 | 1/2002 | Martin | |
| 6,345,362 B1 | 2/2002 | Bertin et al. | |
| 6,347,377 B2 | 2/2002 | Barbee | |
| 6,477,654 B1 | 11/2002 | Dean et al. | |
| 2001/0032067 A1 * | 10/2001 | Nemani et al. | 703/14 |
| 2001/0047511 A1 | 11/2001 | Itou et al. | |
| 2002/0002442 A1 | 1/2002 | Rivin et al. | |
| 2002/0103942 A1 * | 8/2002 | Comeau | 709/321 |
| 2003/0070105 A1 * | 4/2003 | Launiainen | 713/324 |
| 2003/0208343 A1 * | 11/2003 | Baez | 703/2 |

* cited by examiner

*Primary Examiner*—Lynne H. Browne
*Assistant Examiner*—Michael J. Brown
(74) *Attorney, Agent, or Firm*—Michael Le Strange; Hoffman, Warnick & D'Alessandro LLC

(57) ABSTRACT

A machine code builder providing improved software controlled power management is described. A machine code builder reads pre-executable code and builds machine code from the pre-executable code to maximize a duration that a resource is not required. The resource(s) not required may be user defined or the builder can analyze the pre-executable code to determine which resource(s) are not required. The builder re-organizes machine code to maximize the time a particular resource is not used. Mechanisms are also provided to have resource emulation code execute during re-energizing of a resource to prevent loss of performance.

28 Claims, 2 Drawing Sheets

MACHINE CODE BUILDER DERIVED POWER CONSUMPTION REDUCTION

BACKGROUND OF INVENTION

1. Technical Field

The present invention relates generally to microprocessor power consumption, and more particularly, to power consumption reduction for a microprocessor derived from a machine code builder.

2. Related Art

Power management in computer systems has become increasingly important as the trend towards more portable computers continues. In particular, the computer industry is using more powerful microprocessors having more internal circuitry and running at faster speeds. However, battery technology has not advanced sufficiently to keep up with the increasing power consumption of current portable computers. To address this problem, various power management techniques have been implemented that aim to reduce power consumption.

A conventional microprocessor may include a variety of special function units or resources that are used to execute instructions more efficiently, saving power and increasing performance over software. A non-exhaustive list of such units may include a floating point unit, a coprocessor, a branch prediction unit, etc. Many power management techniques focus on reducing the power consumption of these units. In particular, as leakage standby power becomes a more dominant portion of total processor power, it is desirable to turn off units when possible.

Two general schema exist for enabling power management techniques. The first includes dynamically controlling the power provided to microprocessor units using hardware logic. The second includes placing power management processing burdens on software rather than microprocessor hardware.

With regard to dynamic control techniques, PowerPC microprocessors, available from IBM among others, are one example where power consumption is dynamically controlled by monitoring an instruction stream and de-activating units not required to execute the instructions. A problem with dynamic control is that it requires power consuming hardware to continuously monitor and decipher the instruction stream.

U.S. Pat. No. 5,996,083 to Gupta et al. is an example of the evolving technique of placing power management processing burdens on the software rather than the microprocessor hardware. In Gupta et al., a microprocessor with a power control register for each functional unit is described. Gupta et al. state that software adjust settings of the power register for a respective functional unit. The power register controls the power consumption of the respective functional unit by controlling, for example, the clock frequency or voltage supply. Gupta et al., however, assume that the software knows what values should be written to the power control register, and provides no instruction on how the software determines which functional units will be managed.6] Another example of software controlled power management is the Crusoe processor from Transmeta, which is an x86-based CPU chip. The Crusoe processor employs a methodology in which a software translation layer turns x86 instructions into Crusoe instructions. In addition, the processor interprets instructions and recognizes repeat instruction sets. To minimize power consumed in translation, the information is stored in a translation cache and the stored block may be reused for a repeat instruction.

Another issue with software controlled power management is that software is conventionally organized for performance in terms of speed-efficiency, and not efficient power consumption. For example, software may be arranged for speed in such a way that a particular functional unit is called at many different points during execution. When this software is implemented, it may result in the functional unit having its power consumption adjusted many times during execution. In many cases, this continual fluctuation of power consumption reduces power savings, which may also diminish performance. One particular software optimization technique includes profile-directed compilation to improve performance. Feedback recompilation uses the profile data generated during the previous run to perform run-time optimizations such as basic block reordering to reduce the number of mis-predicted branches and instruction cache misses. Unfortunately, none of the above-described optimization techniques have been applied with a focus on power consumption and performance.

Another challenge of conventional power management techniques is maintaining performance. For instance, a functional unit may be turned on and off frequently in a software controlled power management scheme. While this saves some power, it drastically impairs performance because it may take many cycles (e.g., >1000) on a multi-GHz processor for a resource to be re-energized. Gupta et al. attempt to address this situation by temporarily stalling operation of the microprocessor until the selected functional unit is at full power. This solution, however, does not address the loss of performance existing during the re-energization of the resource.

In view of the foregoing, a need remains for power management techniques and architecture that do not suffer from the problems of the related art.

SUMMARY OF INVENTION

The invention provides a machine code builder providing improved software controlled power management. A machine code builder reads pre-executable code and builds the machine code to maximize a duration that a resource(s) is not required. The resource(s) not required may be defined by a software developer, or the builder can analyze the pre-executable code to determine which resource(s) are not required. The builder re-organizes the machine code to maximize the time a particular resource is not used. Mechanisms are also provided to have resource emulation code execute during re-energizing of a resource to prevent loss of performance.

A first aspect of the invention is directed to a method for reducing power consumption of a microprocessor having a plurality of resources, the method comprising the steps of: reading pre-executable code into a machine code builder; and building machine code from the pre-executable code to maximize a duration that a resource is not required.

A second aspect of the invention is directed to a machine code builder for a microprocessor having a resource, the machine code builder comprising: means for reading pre-executable code; and means for building machine code from the pre-executable code to maximize a duration that the resource is not required.

A third aspect of the invention is directed to a machine code building tool comprising: means for reading pre-executable code; and means for directing a resource of a processor to be de-energized during execution of a block of machine code in the case that the block does not use the resource.

A fourth aspect of the invention is directed to a computer program product comprising a computer useable medium having computer readable program code embodied therein for reducing power consumption of a microprocessor, the program product comprising: program code configured to read pre-executable code; and program code configured to build machine code from the pre-executable code to maximize an amount of time that a resource is not required.

The foregoing and other features of the invention will be apparent from the following more particular description of embodiments of the invention.

BRIEF DESCRIPTION OF DRAWINGS

The embodiments of this invention will be described in detail, with reference to the following figures, wherein like designations denote like elements, and wherein.

DETAILED DESCRIPTION

For purposes of organization only, the description includes the following headings: I. Overview; II. Reading-Building, A. User-defined Directive, B. Builder-Derived Resource Usage, C. Re-organizing Code; III. Power Saving Profiling; IV. Code Block Execution Requirement; V. Resource Emulation During Re-energizing; and VI. Function Context Saving.

I. Overview

The invention includes power management techniques and related architecture for, among other things, reading pre-executable code into a machine code builder, and building machine code from the pre-executable code to maximize a duration, i.e., amount of time, that a resource is not required to reduce power consumption.

Figure 1:
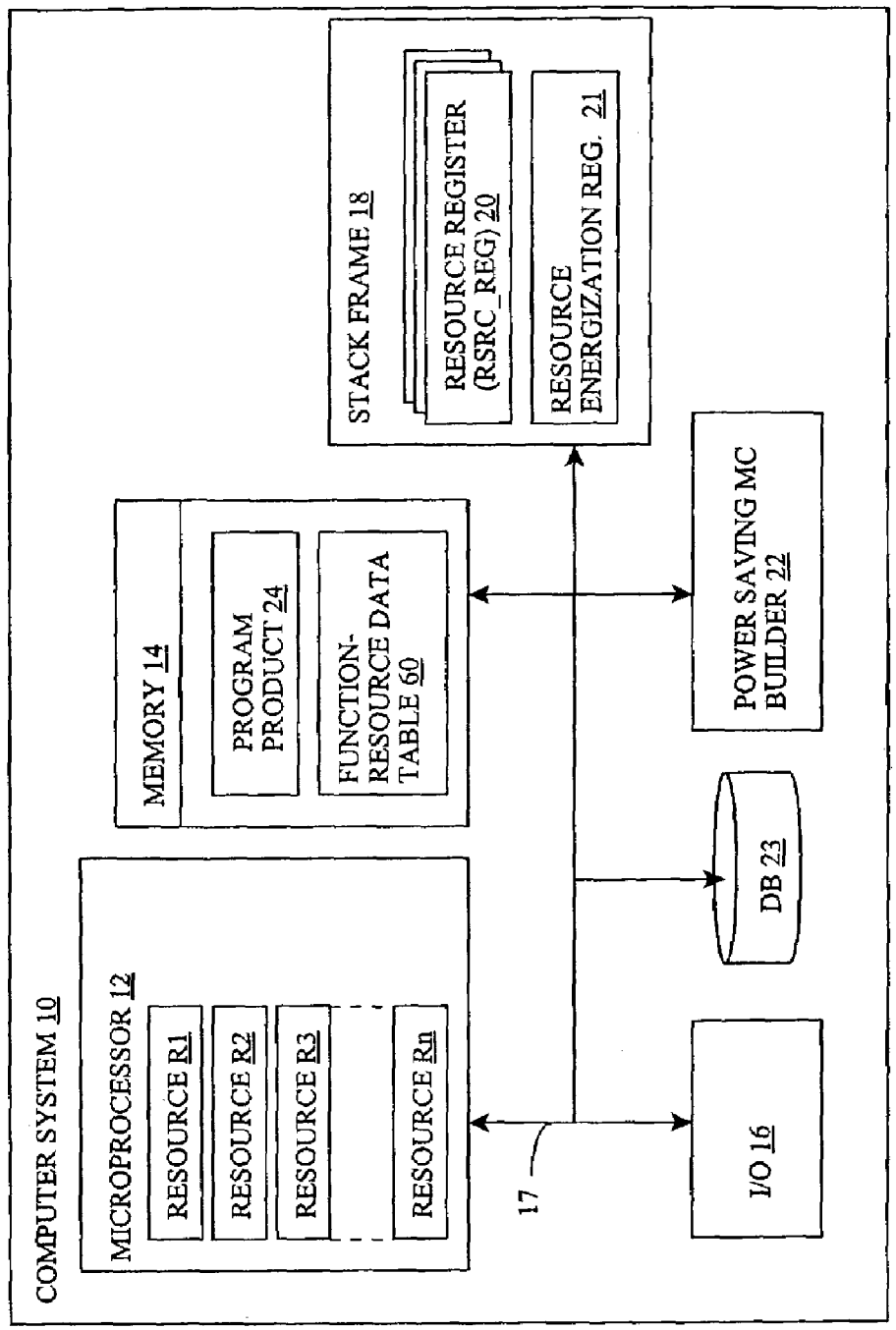
FIG. 1 shows a block diagram of a computer system having a machine code builder for software controlled power management.

With reference to the accompanying drawings, FIG. 1 is a block diagram of a computer system 10 including a microprocessor or central processing unit (CPU) 12. System 10 also includes a memory 14, input/output devices (I/O) 16, a bus 17, a stack frame 18 including a resource register(s) 20 and a resource energization register 21 among a set of other hardware registers (not shown), and a power saving machine code builder 22 (hereinafter MC builder). A database 23 may also be provided for storage of data relative to processing tasks. System 10 may also include any of a variety of well-known interfaces such as: a keyboard, a display, a mouse, a network system, modem, scanner, voice recognition system, printer, disc drives, etc. (not shown). Additional components, such as cache memory, communication systems, system software, etc., may also be incorporated into system 10. Memory 14 includes a program product 24 that, when executed by microprocessor 12, comprises various functional capabilities. In addition, memory 14 includes a function-resource register data table 60, the purpose of which will be described below. While MC builder 22 is shown as a separate structure in FIG. 1, it should be recognized that MC builder 22 can be provided in hardware or as software, i.e., program product 24 apart from applications to which the MC builder is applied.

Microprocessor 12 also includes a plurality of resources R1–Rn (hereinafter resources). A resource is defined herein as a set of logic configured to execute a specific function. A resource may be provided to, for example, execute the specific function more efficiently, save power and/or increase performance. A non-exhaustive list of illustrative resources may include: a floating point unit, a fixed point unit, a branch prediction unit, an integer unit, an I/O, cache memory, a digital signal processor, a register save engine, a bus, a multimedia subsystem, a coprocessor, a data converter, a micro-controller, and any other logic dedicated to providing a specific purpose, function or task. Although shown as part of microprocessor 12, resources R1–Rn may be external to microprocessor 12.

With regard to resource register 20 (RSRC_REG), each register 20 stores values that direct a resource regarding power consumption. Each bit of resource register 20 defines requirements of specific resources. For example, bit 0 could be reserved for a floating point unit (FP), e.g., resource R1. A zero may indicate that the FP unit should be in a power saving mode. The hardware would use the value of resource register 20 to turn off specific resources or switch to a low power mode.

Figure 2:
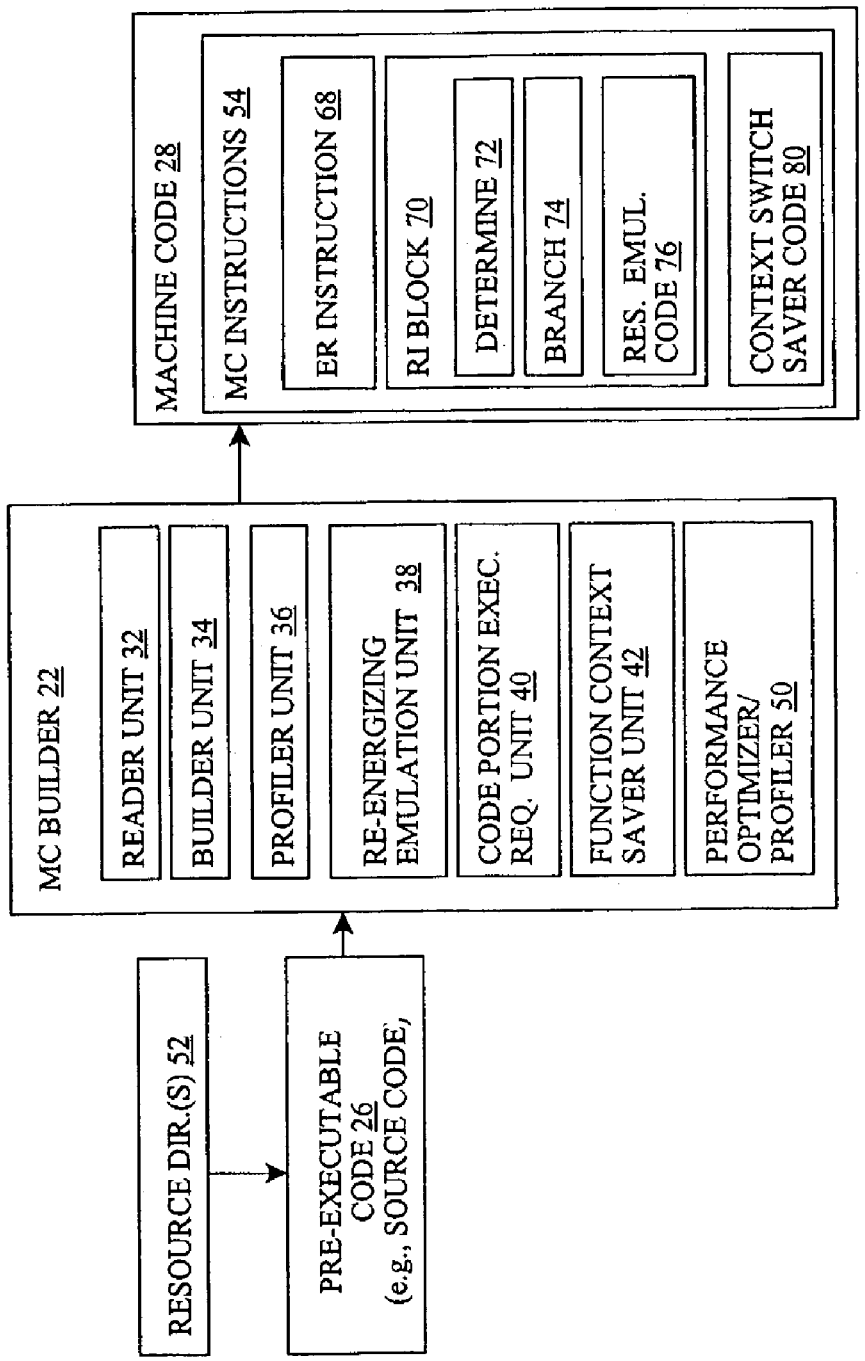
FIG. 2 shows a block diagram of the machine code builder of FIG. 1.

Referring to FIG. 2, MC builder 22 is shown in more detail. MC builder 22 operation, as will be described, may be provided at any stage for generating machine code from some sort of pre-executable code that is now known or later developed. For instance, MC builder 22 may be provided during any of the following stage(s): compiling, coalescing, converting, optimization, linking, post-linking optimization or any other step now known or later developed for producing machine code from pre-executable code. As used herein, pre-executable code shall refer to source code or any intermediate type of code that is not yet executable machine code, source code shall refer to any pre-compiled and user writable code format, and machine code shall refer to any final code intended for execution as an application. Microprocessor 12 (FIG. 1) executes instructions of machine code 28. MC builder 22 includes a reader unit 32 and a builder unit 34. In addition, MC builder 22 may include a profiler unit 36, a re-energizing emulation unit 38, a code block execution requirement (EXEC. REQ.) unit 40, and a function context saver unit 42. The details and function of the above architecture will be described in more detail below. MC builder 22 may also include a conventional performance optimizer/profiler 50 that functions to build machine code for increased performance.

II. Reading-Building

As stated above, the invention includes power management techniques and related architecture for, among other things, reading pre-executable code into an MC builder 22 using reader unit 32 (FIG. 2), and building machine code 28 from the pre-executable code using builder unit 34 (FIG. 2) to maximize a duration that a resource is not required to reduce power consumption.

A. User-Defined Resource Directive

In one embodiment, a resource R1–Rn (FIG. 1) that is not required during at least a block of machine code 28 execution is identified by a resource directive 52 in source code. In this case, pre-executable code 26 is source code. As used herein, a resource directive is a source code instruction pertaining to resource usage and/or power consumption. A resource directive 52 may be inserted in source code by a software developer that is aware of which resources are not required for a particular block of code. Builder unit 34 translates the directive into appropriate machine code instructions (hereinafter MC instructions) 54 in machine code 28 for directing writing to a respective resource register 20 (FIG. 1) to direct usage and/or power consumption for a resource R1–Rn. Each resource directive 52 may be placed anywhere in the source code to specify unused resources known by the software developer. Resource directives 52 are sensitive to program scoping rules such that directives placed within source code blocks or functional blocks remain in effect until that scope is exited.

An illustrative resource directive 52 may look like: #resource <resource_name>=<binary_value>, where <resource_name> is the name of the resource, e.g., FP for floating point unit, BP for branch prediction unit, FX for a fixed point unit, etc. The <binary_value> is "0" if the resource is not required, or non-zero if the resource is always required. An actual example may appear as: #resource FP=0, BP=0, FX2=0. This example indicates that the floating point unit, branch prediction unit and the $2^{nd}$ fixed point units are not needed. Builder unit 34 converts these directives into MC instructions 54 (FIG. 2) that de-energize, i.e., turn off, these resources. MC instructions 54 write to a resource register 20 (FIG. 1) that directs a respective resource's power consumption and/or usage in a known fashion. For example, resource register 20 may direct a clock frequency to zero for the resource, constructively de-energizing the resource. For Power PC based processors, the "mtspr" instruction may be used to provide this functionality.

B. Builder-Derived Resource Usage

In a second alternative embodiment, a resource R1–Rn (FIG. 1) that is not required during at least a block of machine code 28 execution is determined by builder unit 34 from pre-executable code 26. That is, builder unit 34 analyzes the pre-executable code to determine resource requirements. In this case, builder unit 34 includes mechanisms for analyzing pre-executable code 26 within the scope of each function or block to determine which resource(s) R1–Rn (FIG. 1) are used or unused. In one example, builder unit 34 may analyze pre-executable code 26 to locate branch code that includes resource-specific code. From this analysis, block(s) of machine code that have common unused resource(s) can be determined. Similarly, builder unit 34 can identify blocks of pre-executable code 26 in which, for example, multimedia co-processor is not being used.

C. Re-organizing Code

Builder unit 34 reorders or re-organizes machine code 28 using analytic methods, to maximize a duration that a resource is not required to reduce power consumption. In one example, builder unit 34 may use dependency analysis similar to that commonly used for performance optimization, but to re-organize machine code 28 to maximize the duration that a resource is not required. In one example, builder unit 34 may take those blocks of machine code that have common unused resource(s), and re-organize them to be executed sequentially, thus maximizing a duration that the unused resource(s) is not required. This is in contrast to conventional compiler optimization in which MC instructions 54 are reorganized to maximize performance. Builder unit 34 also directs a resource of a processor to be de-energized during execution of a block of machine code in the case that the block does not use the resource. For instance, if a resource R1 is not used during a block of machine code, resource R1 is turned off. Builder unit 34 may also work in conjunction with a conventional performance optimizer/profiler 50 to optimize performance and power consumption according to user preferences.

III. Power Saving Profiling

Another aspect of the invention includes a profiler unit 36 being provided as part of MC builder 22. In operation, builder unit 34 produces machine code 28 from pre-executable code 26, and profiler unit 36 executes machine code 28 generated by builder unit 34 and gathers run-time data from the execution environment to determine resource requirements. The run-time data is then used by builder unit 34 to again re-organize machine code 28 to maximize a duration that a resource is not required to reduce power consumption. To illustrate operation, assume a resource R1 (FIG. 1) consumes a lot of power through leakage currents, is rarely used, and accordingly is preferably turned off for extended periods. Also assume that during initial analysis, builder unit 34 builds machine code 28 to call resource R1 to execute its respective function. Analysis with profiler unit 36, however, may indicate from execution of the initial machine code 28 that although resource R1 is required, other available resources R2 and R3 execute the same function as resource R1 with better power efficiency. Profiler unit 36 then may direct builder unit 34 to replace the call for resource R1 with appropriate instructions for resources R2 and R3. As a result, the specific function is implemented and resource R1 remains off for a longer period of time, thus reducing power consumption.

IV. Code Block Execution Requirement

Another aspect of the invention allows resource performance to be adjusted to meet a real time execution requirement for a block of machine code. In particular, if a software developer knows an execution requirement for a block of source code, he/she may provide a resource directive 52, as discussed above, anywhere in source code to implement the requirement. A code block execution requirement unit 40 (hereinafter CPER unit) of MC builder 22 is responsive to the execution requirement (i.e., resource directive 52) to direct builder unit 34 to insert an execution requirement (ER) instruction 68 in machine code 28 for adjusting a resource's performance to meet the execution requirement.

An execution requirement may take a variety of forms. In one embodiment, the execution requirement may be a performance level for a respective resource R1–Rn. In this regard, a block of machine code may require, for example, a specific million instructions per second (MIPS) performance level. In another embodiment, the execution requirement may be a time constraint, i.e., a duration or time period, in which the respective block of machine code must execute. In this regard, blocks of machine code oftentimes have execution time constraints that are known. For example, a video game may require that some number of graphical display frames be displayed per second, e.g., a frame every 30 times per second. In other words, a preset duration, defined by a time point A to time point B, in which some function must be completed is known. Other types of execution requirements are also possible.

With regard to execution requirement structure, to allow multiple execution requirements to be supported simultaneously, each resource directive 52 will have a symbol name associated with it. For example, a directive for a time constraint type execution requirement might look like this: #TIME_STAMP frames_per_second, 33.

Implementation of a performance level-type execution requirement requires a resource directive 52 to simply state a performance level. An example may be to provide a Dhrystone MIPS (DMIPS) equivalent value in a resource directive 52, e.g., #PERF_STAMP 350, where the 350 indicates the MIPS value to be used. In this case, CPER unit 40 would direct builder unit 34 to insert an ER instruction 68 to simply pass this value on to the operating system, via system call, so the operating system could adjust the appropriate resource(s) performance level to meet the specified performance rating. Since the DMIPS rating of the processor is proportional to the frequency, each microprocessor 12 need only have its DMIPS/MHz rating to perform the appropriate adjustment.

Implementing a time constraint-type execution requirement requires an ER instruction 68 that is configured to analyze "performance affecting parameters" to determine what resource performance adjustment must be made to meet the execution requirement. Performance affecting parameters may include, for example, an initial clock frequency, processor speed, number of instructions that have to be executed, number of cycles required to complete those instructions on average, or any other parameter that affects performance. A resource directive for this type execution requirement may appear as, for example: #TIME_STAMP frames_per-second, 33. This directive 52 indicates that execution should proceed to this point in the code 33 milliseconds after the previous time stamp was encountered that references the same "frames_per_second" symbol name. A time stamp as used herein is a pointer or indicator in source code that indicates where a time constraint begins or ends. Based on this execution requirement, CPER unit 40 directs builder unit 34 to generate an ER instruction 68 that is capable of analyzing the requisite performance parameter(s) and directing the appropriate performance adjustment. For example, ER instruction 68 determines whether the execution requirement can be met with the initial performance parameters.

If the initial settings do not allow meeting of the execution requirement, performance is adjusted for the respective block of machine code 28. Performance adjustment may take a variety of forms such as at least one of clock frequency adjustment, voltage adjustment, a reallocation of resources (i.e., changing of resources used to execute a function), adjustment of "function" scheduling when multiple functions are running, or any other adjustment that affects performance. As used herein, a function may be any software application, user, hardware (including other processors) that calls upon microprocessor 12 to complete a task. Where the execution requirement is exceeded, ER instruction 68 would direct a reduction in performance, e.g., a reduction in clock frequency, to slow processing speed and hence reduce power consumption by the resource. For example, if an execution requirement mandates a duration of 33 ms for 10 million instructions of machine code, and ER instruction 68 determines actual execution time will be 20 ms, clock frequency may be slowed during execution of the code block. In contrast, where the execution requirement is not met, ER instruction 68 may direct an increase in performance, e.g., an increase in clock frequency to increase processing speed.

It should be recognized that an exact meeting of the execution requirement may not be necessary. In this case, the amount of increase or decrease in performance should take into account the percentage difference in target and actual execution, as well as some damping and hysteresis to make control well behaved.

With further regard to implementation of a time constraint execution requirement, one embodiment of how this can be compiled into ER instructions 68 will now be described. It should be recognized, however, that there may be a number of other ways in which this can be implemented, all of which are considered within the scope of the invention. For purposes of description, we will assume that no additional instructions are added to the instruction set architecture (ISA) for microprocessor 12, though it may be advantageous to provide such support. Instead, we will assume that a time_stamp system call is defined in the operating system, and used by the function as follows. Builder unit 34 allocates a long integer as a global variable, referenced by the symbol name in resource directive 52, to hold a time stamp. In the example above, frames_per_second is the symbol name. The time stamp is initialized to zero by the function, i.e., no valid time stamp. Machine code 28 generated for resource directive 52 by builder unit 34 first loads a current time stamp into a resource register 20. This time stamp comes from a time base or real time clock facility (not shown). Next the previous value for the time constraint, held in a global variable in memory, is loaded into another register 20. If the previous value is zero, the new value is stored in the global variable, and processing continues. If the previous value is a valid time stamp, the difference of the previous and current values is compared with the target constant value, e.g., 33 ms in the example above, which is stored by builder unit 34 with the other global constants. The percent difference, i.e., ((current−previous)−target)/target, is computed and passed to the operating system using the system call facility. Assuming register sizes that are wide enough to hold time stamps, the pseudo ER instruction 68 may look like this:

| Static Long int frames_per_second; #define ms_per_frame 33 | | |
|---|---|---|
| Mfspr | r3, TB | ; get current time stamp |
| Ld | r4, frames_per_second(TOC) | ; TOC points to global area |
| Cmpi | r4, 0 | ; if prev time stamp is invalid |
| Beq | continue | ; skip adjustment code |
| Sub | r5, r3, r4 | ; compute time since last time stamp |
| Shr | r5, xx | ; convert difference to milliseconds |
| Ld | r6, ms_per_frame(TOC) | ; get target period |
| Sub | r7, r5, r6 | ; compare actual and target |
| Div | r3, r7, r6 | ; compute percent error |
| Addi | r2, xx | ; put time_sync sc index in r2 |
| Sc | | ; call time_sync via system call |

V. Resource Emulation During Re-energizing

Re-energizing a resource R1–Rn (FIG. 1) such as a floating point unit can take more than 1000 cycles on a mult-GHz processor. To make use of this processing time, the invention provides a scheme that allows machine code 28 (FIG. 2) to branch to resource emulation code that would not use the resource while it is being re-energized. In particular, resource energization register 21 (FIG. 1) can be defined to indicate whether a resource is powered and available. Re-energizing emulation unit 38 analyzes pre-executable code 26 to determine whether branch code exists that contains instructions for the particular resource. If branch code for a resource is present, re-energizing emulation unit 38 directs builder unit 34 to insert a re-energizing instruction block (RI block) 70 in machine code 28. RI block 70 includes a determination instruction 72 that checks resource energization register 21 (FIG. 1) during execution to see if the resource is energized and available. If the test returns negative, a branch instruction 74 (FIG. 2) of RI block 70 branches to an alternative block of code which contains resource emulation code 76 that can emulate instructions performed by the resource. Determination instruction 72 is reiterated periodically to continue testing the resource's energization register 21 (FIG. 1) to see if the resource is energized. When the resource becomes energized, resource energization register 21 is marked valid and the determination instruction 72 test is positive. In this case, branch instruction 74 returns execution to machine code 28 that will use the resource.

VI. Function Context Saving

As known to those in the art, a microprocessor 12 may be called upon to execute machine code 28 for a variety of co-pending functions. Again, a function may be any software application, user, hardware (including other processors) that calls upon microprocessor 12 to complete a task. In order to accommodate these operations, microprocessor 12 executes context switches between the entities that are using it, e.g., it may conduct time slicing by running one application's code for 1 ms, another application's code for the next 1 ms, etc. Each function, however, may require different resource usage and power consumption. Accordingly, it is advantageous to provide microprocessor 12 with the ability to quickly switch between each function's preferred resource power consumption data. Resource power consumption data as defined herein may include for each function: resources used or unused, power consumption settings for each used resource and any other information useful for power management of a resource.

In order to accommodate this operation, a function context saver unit 42 of MC builder 22 is configured to direct builder unit 34 to insert context switch saver code 80 in machine code 28. Context switch saver code 80 includes an instruction for saving resource power consumption data for a pending function, and an instruction for recalling resource power consumption data for a next function when a context switch occurs, i.e., a function change occurs. Resource power consumption data may be stored in many forms. In one embodiment, resource power consumption data is stored for a number of functions in the form of a function-resource data table 60 (FIG. 1). When a next function is called, context switch saver code 80 recalls resource power consumption data for the called function and places the appropriate values in resource register 20 (FIG. 1). As shown in FIG. 1, stack frame 18 is extended to include space for resource register 20. For a new function, the respective resource power consumption data value(s) would be pushed onto the stack as part of stack frame 18 to form resource register 20. Function context saving allows microprocessor 12 to quickly switch between functions and recall preferred power management settings for each function.

In the previous discussion, it will be understood that the method steps discussed are performed by a processor, such as CPU 12 of system 10, executing instructions of program product 24 stored in memory. It is understood that the various devices, modules, mechanisms and systems described herein may be realized in hardware, software, or a combination of hardware and software, and may be compartmentalized other than as shown. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims

The invention claimed is:

1. A method for reducing power consumption of a microprocessor having a plurality of resources, the method comprising:
   reading pre-executable code into a machine code builder;
   building machine code from the pre-executable code to identify blocks of machine code with a common resource; and
   reorganizing the blocks of machine code with the common resource sequentially to maximize a duration that the common resource is not required.

2. The method of claim 1, wherein the building is directed by a user-defined directive that identifies the common resource.

3. The method of claim 1, wherein the building includes analyzing the pre-executable code to determine resource requirements.

4. The method of claim 1, wherein the building includes profiling the pre-executable code to determine resource requirements, wherein the profiling determines all available resources that can execute a specified function that is in accordance with the resource requirements and selects a resource from all of the available resources to execute the specified function, wherein the selected resource has a better power efficiency as compared to the other available resources.

5. The method of claim 4, wherein the profiling includes executing the machine code, and again re-organizing the machine code to maximize a duration that the common resource is not required.

6. The method of claim 1, further comprising executing a resource emulation program code during re-energizing of a resource.

7. The method of claim 6, further comprising inserting an instruction into the machine code during building to carry out the executing in the case that the pre-executable code includes branch code having resource-specific code.

8. The method of claim 7, wherein the instruction determines whether the common resource is energized and available, and executes the resource emulation code in the case that the common resource is de-energized.

9. The method of claim 1, further comprising saving resource power consumption data for a function.

10. The method of claim 9, further comprising recalling resource power consumption data for a function in the case that the function is called.

11. The method of claim 1, further comprising identifying an execution requirement for a block of machine code, and adjusting a resource performance to meet the execution requirement.

12. The method of claim 11, wherein the execution requirement is one of a duration in which a block of machine code must execute and a performance level for a block of machine code.

13. The method of claim 12, wherein the resource performance is adjusted by changing at least one of a clock frequency, a voltage, a resource allocation and a function schedule.

14. A machine code builder for a microprocessor having a plurality of resources, the machine code builder comprising:
   means for reading pre-executable code;
   means for building machine code from the pre-executable code to identify blocks of machine code with a common resource; and
   means for reorganizing the blocks of machine code with the common resource sequentially to maximize a duration that the common resource is not required.

15. The machine code builder of claim 14, wherein the means for building is responsive to a user-inserted directive in the pre-executable code.

16. The machine code builder of claim 14, wherein the means for building analyzes the pre-executable code to determine the common resource.

17. The machine code builder of claim 14, further comprising means for profiling the machine code to determine the common resource, and wherein the means for building is responsive to the profiling means, wherein the profiling means determines all available resources that can execute a specified function that is in accordance with the resource requirements and selects a resource from all of the available resources to execute the specified function, wherein the selected resource has a better power efficiency as compared to the other available resources.

18. The machine code builder of claim 14, further comprising means for inserting an instruction into the machine code during building to direct execution of a resource emulation code during re-energizing of the common resource.

19. The machine code builder of claim 18, wherein the instruction determines whether the common resource is energized and available, and executes the resource emulation code in the case that the common resource is de-energized.

20. The machine code builder of claim 14, further comprising means for inserting an instruction into the machine code during building to direct saving of resource power consumption data for a first function, and an instruction to direct recalling of resource power consumption data for a second function in the case that the second function is called.

21. The machine code builder of claim 14, further comprising means for inserting an instruction in the machine code to adjust a resource performance to meet an execution requirement.

22. The machine code builder of claim 21, wherein the execution requirement is one of a duration in which a block of machine code must execute and a performance level for a block of machine code.

23. The machine code builder of claim 21, wherein the resource performance is adjusted by changing at least one of a clock frequency, a voltage, a resource allocation and a function schedule.

24. A machine code building tool comprising:
   means for reading pre-executable code;
   means for reorganizing blocks of machine code with a common resource sequentially; and
   means for directing the common resource of a processor to be de-energized during execution of the blocks of machine code in the case that the blocks do not use the common resource.

25. The machine code builder of claim 24, further comprising means for directing execution of a resource emulation code that emulates instructions performed by the common resource during re-energizing of the common resource.

26. A computer program product comprising a computer useable medium having computer readable program code embodied therein for reducing power consumption of a microprocessor, the program product comprising:
   program code configured to read pre-executable code;
   program code configured to build machine code from the pre-executable code to identify blocks of machine code with a common resource; and
   program code configured to organize the blocks of machine code with the common resource sequentially to maximize a duration that the common resource is not required.

27. The program product of claim 26, further comprising:
   program code configured to determine whether a resource of the microprocessor is de-energized; and
   program code configured to emulate resource functioning during re- energizing of the resource.

28. The program product of claim 27, further comprising program code for inserting an instruction into machine code during building to conduct the determining step and the executing step in the case that the pre-executable code includes branch code having resource-specific code.

* * * * *